(12) United States Patent
Hsiao et al.

(10) Patent No.: US 8,422,168 B2
(45) Date of Patent: Apr. 16, 2013

(54) MAGNETIC WRITE HEAD HAVING A SELF-ALIGNED SIDE WRAP-AROUND SHIELD WITH MULTI-ANGLE SLANTED BUMP

(75) Inventors: Wen-Chien David Hsiao, San Jose, CA (US); Aron Pentek, San Jose, CA (US); Sue Siyang Zhang, Saratoga, CA (US); Yi Zheng, San Ramon, CA (US)

(73) Assignee: HGST Netherlands B.V., Amsterdam (NL)

( * ) Notice: Subject to any disclaimer, the term of this patent is extended or adjusted under 35 U.S.C. 154(b) by 786 days.

(21) Appl. No.: 12/343,709

(22) Filed: Dec. 24, 2008

(65) Prior Publication Data

US 2010/0157472 A1 Jun. 24, 2010

(51) Int. Cl.
*G11B 5/127* (2006.01)
(52) U.S. Cl.
USPC .................................. 360/125.07; 360/125.3
(58) Field of Classification Search .................. None
See application file for complete search history.

(56) References Cited

U.S. PATENT DOCUMENTS

| 7,110,217 | B2 | 9/2006 | Lee et al. ....................... 360/126 |
| 7,924,528 | B2* | 4/2011 | Sasaki et al. ............. 360/125.15 |
| 2005/0219747 | A1* | 10/2005 | Hsu et al. ....................... 360/126 |
| 2006/0082924 | A1 | 4/2006 | Etoh et al. ...................... 360/125 |
| 2006/0174474 | A1 | 8/2006 | Le ............................... 29/603.12 |
| 2008/0151437 | A1 | 6/2008 | Chen et al. .................... 360/319 |
| 2009/0144966 | A1* | 6/2009 | Zheng ......................... 29/603.18 |
| 2009/0268350 | A1* | 10/2009 | Hsiao et al. ................... 360/319 |

\* cited by examiner

*Primary Examiner* — Holly Rickman
(74) *Attorney, Agent, or Firm* — Zilka-Kotab, PC

(57) ABSTRACT

A method for forming a magnetic write head having a trailing shield with a tapered and stepped, self aligned trailing magnetic shield. The shield has a tapered portion that tapers away from the write pole as it extends away from the ABS. This tapered portion helps to channel flux to the pole tip portion of the shield, while preventing the loss of write field to the shield. The stepped portion of the shield further helps to prevent the loss of write field and also defines a secondary throat height of the shield that can be accurately located relative to the air bearing surface.

10 Claims, 29 Drawing Sheets

MAGNETIC WRITE HEAD HAVING A SELF-ALIGNED SIDE WRAP-AROUND SHIELD WITH MULTI-ANGLE SLANTED BUMP

FIELD OF THE INVENTION

The present invention relates to perpendicular magnetic recording and more particularly to a magnetic write head having a wrap-around trailing shield having a tapered portion that tapers away from the write pole and a stepped portion that steps away from the write pole.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \Theta$, where $\Theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

SUMMARY OF THE INVENTION

The present invention provides a method for forming a write pole having a tapered, stepped trailing shield. The trailing shield formed by this method has a sloped portion and a stepped portion, the sloped portion being located between the stepped portion and the air bearing surface.

The sloped portion of the trailing shield tapers away from the write pole as it extends from the air bearing surface. This advantageously channels flux to the pole tip region, while also preventing the loss of magnetic write field to the shield.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
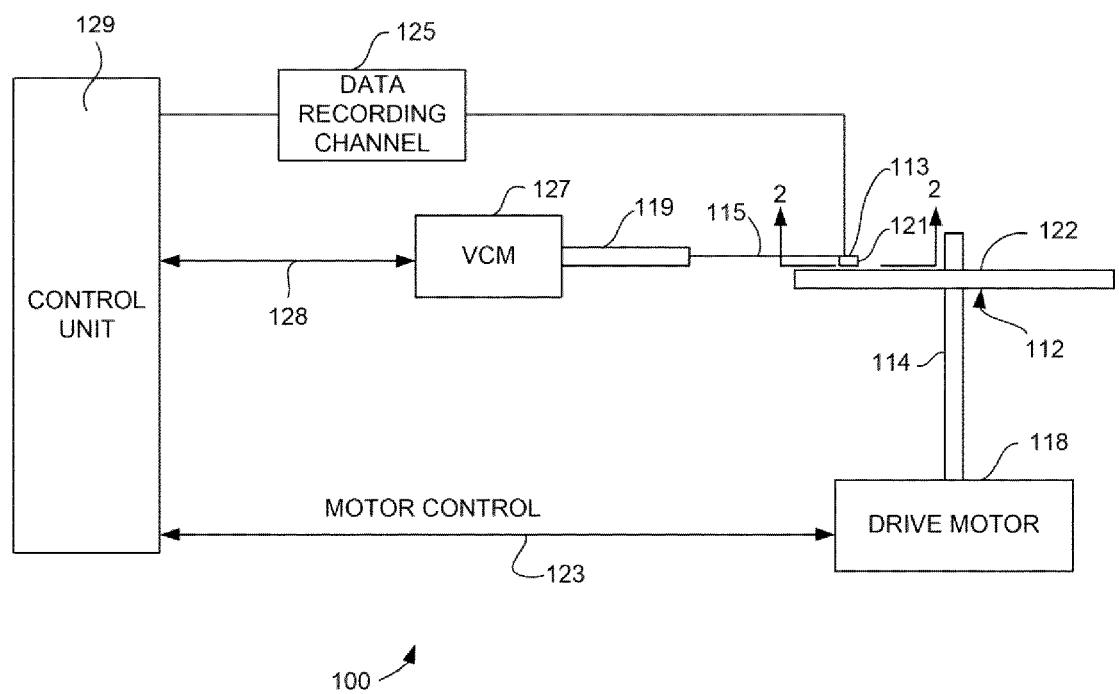
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
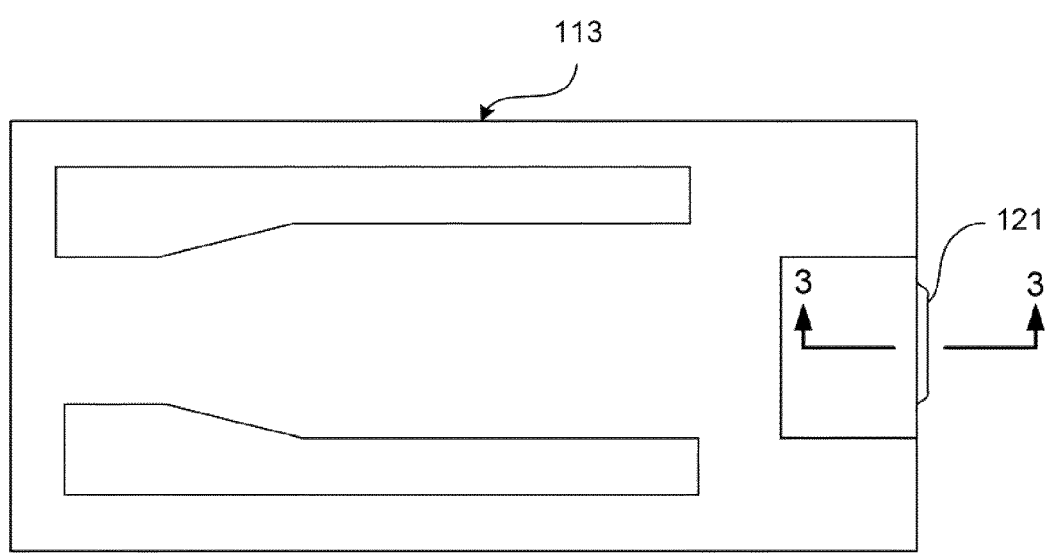
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
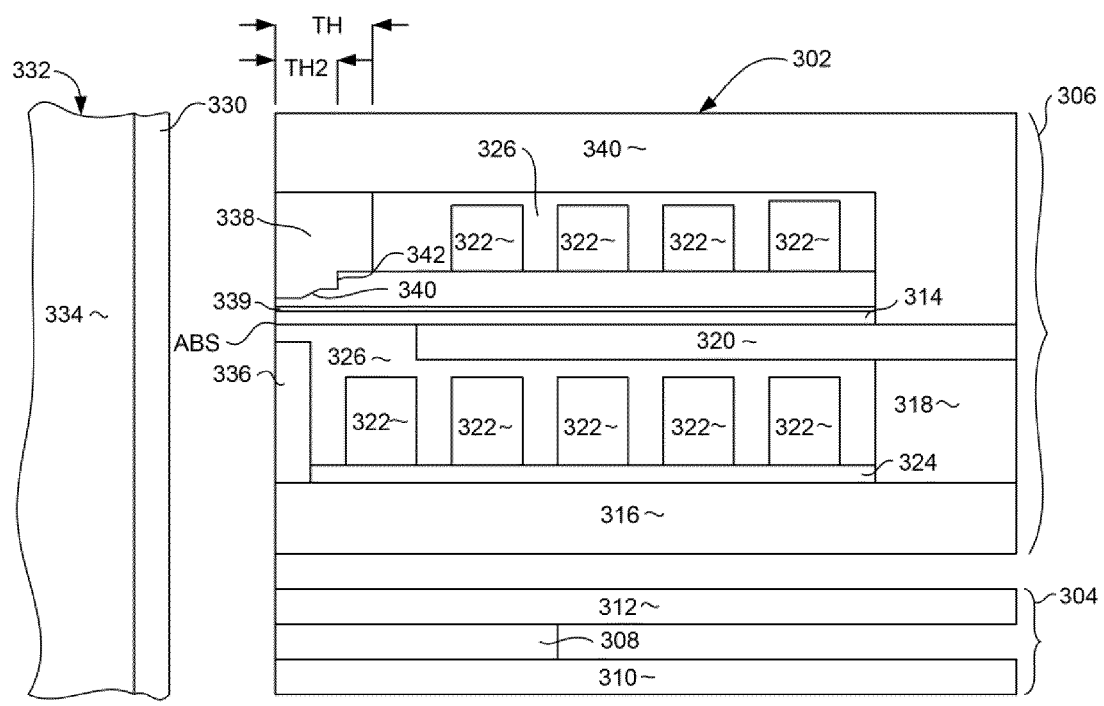
FIG. 3 is a cross sectional view of a magnetic head, taken from line 3-3 of FIG. 2 and rotated 90 degrees counterclockwise, of a magnetic head according to an embodiment of the present invention.

With reference now to FIG. 3, the invention can be embodied in a magnetic head 302. The magnetic head 302 includes a read head 304 and a write head 306. The read head 304 includes a magnetoresistive sensor 308, which can be a GMR, TMR, or some other type of sensor. The magnetoresistive sensor 308 is located between first and second magnetic shields 310, 312.

The write head 306 includes a magnetic write pole 314 and a magnetic return pole 316. The write pole 314 can be formed upon a magnetic shaping layer 320, and a magnetic back gap layer 318 magnetically connects the write pole 314 and shaping layer 320 with the return pole 316 in a region removed from the air bearing surface (ABS). A write coil 322 (shown in cross section in FIG. 3) passes between the write pole and shaping layer 314, 320 and the return pole 316, and may also pass above the write pole 314 and shaping layer 320. The write coil 322 can be a helical coil or can be one or more pancake coils. The write coil 322 can be formed upon an insulation layer 324 and can be embedded in a coil insulation layer 326 such as alumina and or hard baked photoresist.

In operation, when an electrical current flows through the write coil 322. A resulting magnetic field causes a magnetic flux to flow through the return pole 316, back gap 318, shaping layer 320 and write pole 314. This causes a magnetic write field to be emitted from the tip of the write pole 314 toward a magnetic medium 332. The write pole 314 has a cross section at the ABS that is much smaller than the cross section of the return pole 316 at the ABS. Therefore, the magnetic field emitting from the write pole 314 is sufficiently dense and strong that it can write a data bit to a magnetically hard top layer 330 of the magnetic medium 332. The magnetic flux then flows through a magnetically softer under-layer 334, and returns back to the return pole 316, where it is sufficiently spread out and weak that it does not erase the data bit recorded by the write pole 314. A magnetic pedestal 336 may be provided at the air bearing surface ABS and attached to the return pole 316 to prevent stray magnetic fields from the bottom leads of the write coil 322 from affecting the magnetic signal recorded to the medium 332.

In order to increase write field gradient, and therefore increase the speed with which the write head 306 can write data, a trailing, wrap-around magnetic shield 338 can be provided. The trailing, wrap-around magnetic shield 338 is separated from the write pole by a non-magnetic layer 339. The trailing shield 338 attracts the magnetic field from the write pole 314, which slightly cants the angle of the magnetic field emitting from the write pole 314. This canting of the write field increases the speed with which write field polarity can be switched by increasing the field gradient. A trailing magnetic return pole 340 can be provided and can be magnetically connected with the trailing shield 338. Therefore, the trailing return pole 340 can magnetically connect the trailing magnetic shield 338 with the back portion of the write pole 302, such as with the back end of the shaping layer 320 and with the back gap layer 318. The magnetic trailing shield is also a second return pole so that in addition to magnetic flux being conducted through the medium 332 to the return pole 316, the magnetic flux also flows through the medium 332 to the trailing return pole 340.

The use of a trailing shield 338 generally involves a tradeoff. On one hand, the trailing shield should have a large enough throat height (as measured from the ABS) that does not become magnetically saturated, and distance between the shield 338 and the write pole should be sufficiently small as to effectively increase the field gradient. On the other hand, if the throat height is too large, or if the trailing shield is too close to the write pole 314, then too much magnetic flux can leak from the write pole 314 to the shield 338, thereby weakening the write field.

The present invention mitigates both of these competing interests by providing a self-aligned, wrap-around, trailing shield 338 that is both tapered and stepped away from the write pole 314. As can be seen in FIG. 3, the shield 338 has a sloped portion 340 that tapers away from the write pole 314. The shield 338 also has a stepped portion 342 that further removes the trailing shield 338 from the write pole, and provides a secondary shield throat height (TH2), measured from the ABS as shown in FIG. 3. The taper 340 allows the shield to be close to the write pole 314 near the ABS where it is most desired for increasing field gradient. However, tapering the shield 338 away from the write pole 314 reduces the amount of flux lost to the shield 338 from the write pole 314. The step 342 further removes the shield 338 from the write pole 314 and also provides an easily definable secondary throat height TH2 that can be accurately located relative to the ABS. Furthermore, these goals are accomplished while also preventing magnetic saturation of the shield 338, since the step 342 and taper 340 help to channel magnetic flux from the pole tip region to the larger portion of the shield 338 removed from the write pole 314.

Figure 4:
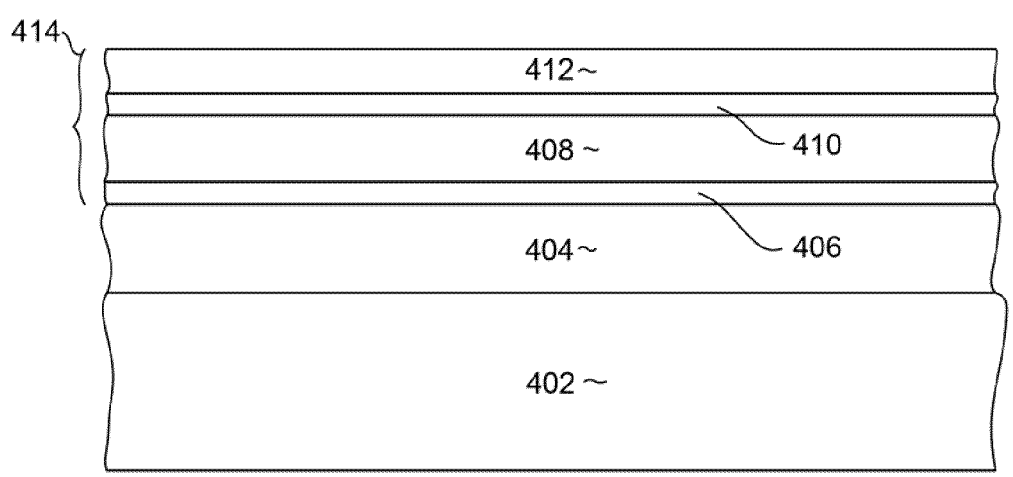
FIGS. 4-28 show a portion of a write head in various intermediate stages of manufacture illustrating a method for manufacturing a write head according to an embodiment of the invention.

With reference now to FIGS. 4-28, a method is described for manufacturing a write head (such as the write head 306 of FIG. 3) having a tapered, stepped wrap-around trailing shield (such as the shield 338 of FIG. 3). With particular reference to FIG. 4, a substrate 402 is provided. This substrate 402 can include an alumina fill layer such as the layer 326 of FIG. 3 and may also include the magnetic shaping layer 320 shown in FIG. 3. A layer of magnetic write pole material 404 is deposited over the substrate 420. This magnetic write pole is preferably a lamination of layers of high magnetic moment material separated by thin layers of non-magnetic material. A series of one or more mask layers 414 are then deposited over the write pole material 404. The series of mask layers 414 can include a non-magnetic first hard mask 406 such as a thin alumina layer formed directly on the write pole 404. An image transfer layer 408 can be deposited over the non-magnetic first hard mask layer 406. The image transfer layer 408 can be a soluble polyimide material such as DURA-MIDE® or some other suitable material. A second hard mask 410, may be provided over the image transfer layer 408. A patternable material such as photoresist 412 is deposited at the top of the series of mask layers 414.

Figure 5:
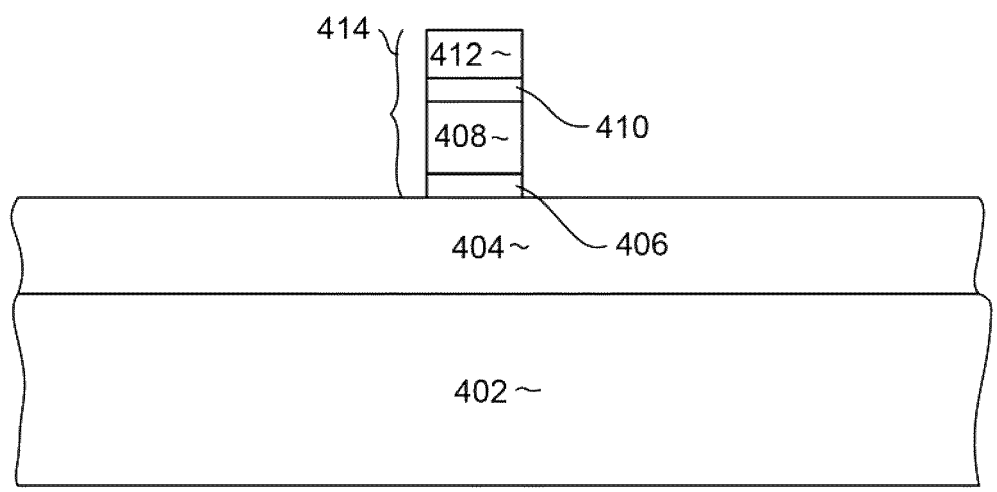

With reference now to FIG. 5, the photoresist layer 412 is photolithographically patterned and developed to define the image of a desired write pole (such as the write pole 314 of FIG. 3). This is shown in cross section in FIG. 5 in a plane parallel with the air bearing surface (ABS). Then, the image of the photoresist layer 412 is transferred onto the underlying mask layers 406, 408, 410. This may include one or more steps of (reactive) ion milling and/or reactive ion etching (RIE).

Figure 6:
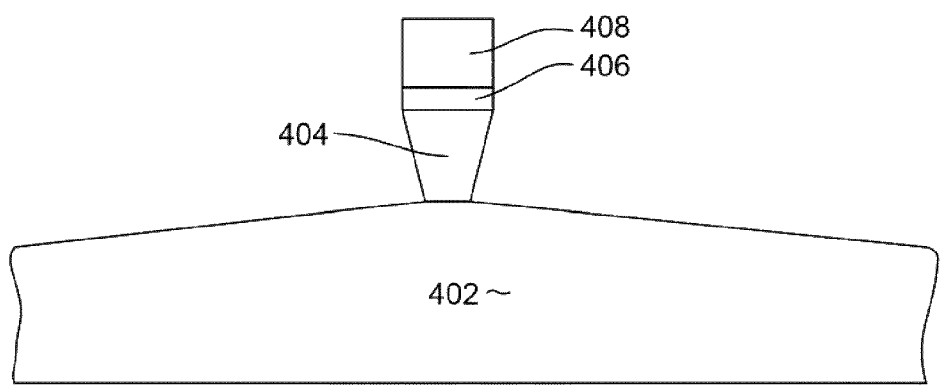

A sweeping ion milling is then performed to remove portions of the magnetic write pole material 404 that are not protected by the overlying mask layers 406, 408, 410, 412. This sweeping ion milling can be performed at one or more angles relative to normal in order to form the remaining write pole material 404 with tapered sides, resulting in the write pole 404 having a trapezoidal shape as shown in FIG. 6. This sweeping ion milling likely removes some of the series of mask layers 414, such as layers 412, 410, and a portion of layer 408, leaving layers 406, 408 as shown in FIG. 6. A wet/dry stripping process will be applied to remove remaining portion of layer 408, and only leave layer 406 over pole 404.

Figure 7:
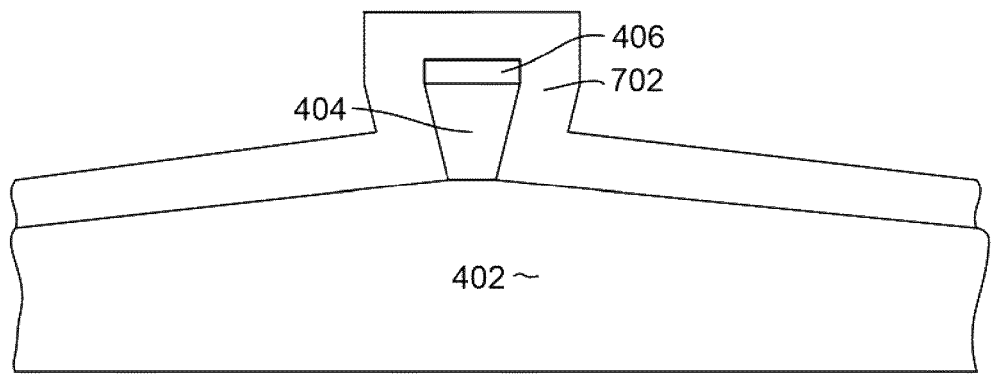
Figure 8:
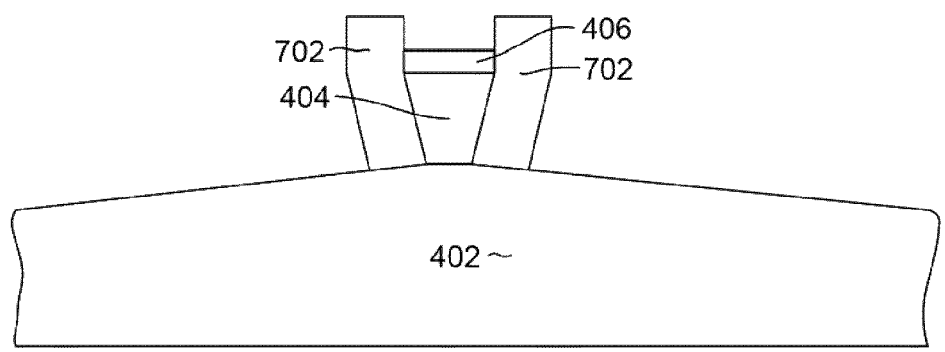

Then, with reference to FIG. 7 a layer of non-magnetic side gap material 702 is deposited. This side gap material 702 is preferably alumina, deposited by a conformal deposition process such as atomic layer deposition or chemical vapor deposition. Then, with reference to FIG. 8, direction material removal process such as ion milling or reactive ion milling (RIM) is performed to preferentially remove horizontally disposed portions of the alumina layer 702, stopping at layer 406. This results in non-magnetic side walls 702 being formed at either side of the write pole 404.

Figure 9:
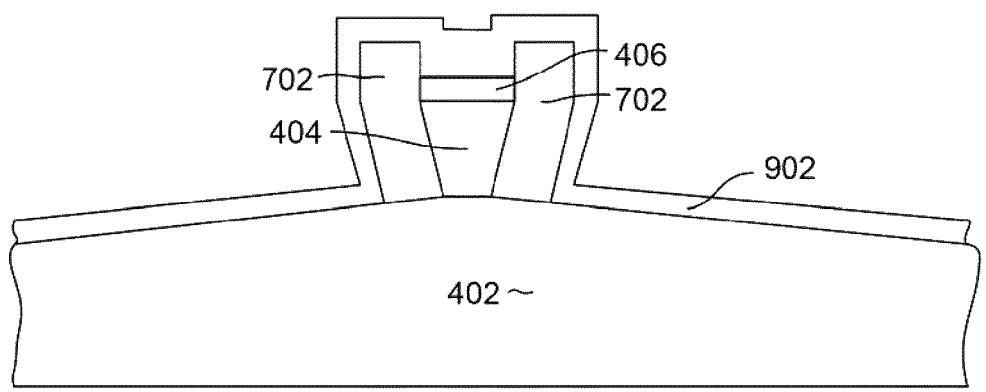
Figure 10:
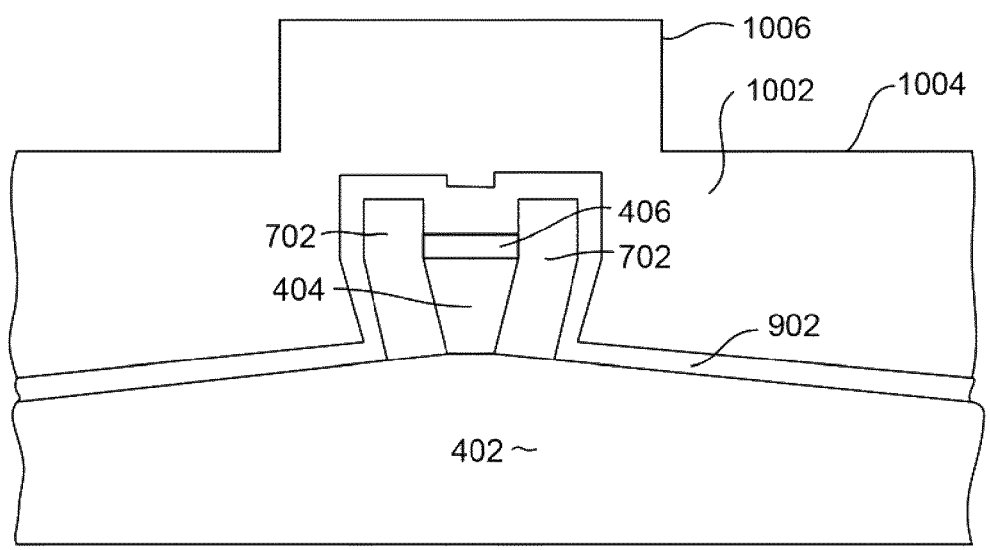

With reference now to FIG. 9, a material that is resistant to reactive ion etching (RIE stop layer) 902 is deposited full film. This layer 902 can be a non-magnetic material such as NiCr, Cr, Ru, Ta, Ir, Rh, etc. and is preferably deposited to a thickness of 40-60 nm or about 50 nm. Then, with reference to FIG. 10, a fill layer 1002 is deposited. The fill layer 1002 can be any non-magnetic RIEable material such as $Al_2O_3$, $SiO_2$, SiN, $SiO_xN_y$, TaO, etc., and is preferably alumina and is deposited to a thickness such that its surface 1004 adjacent to the write pole is above the height of the write pole 404, side wall 702 and RIE stop layer 902.

Figure 11:
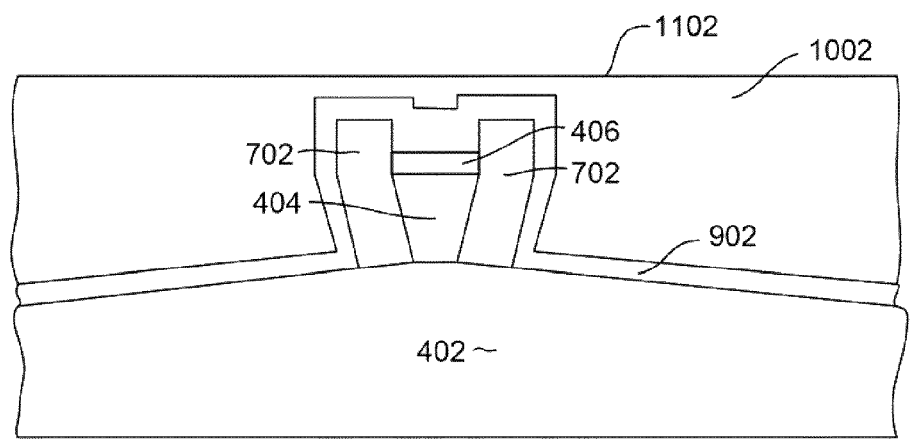
Figure 12:
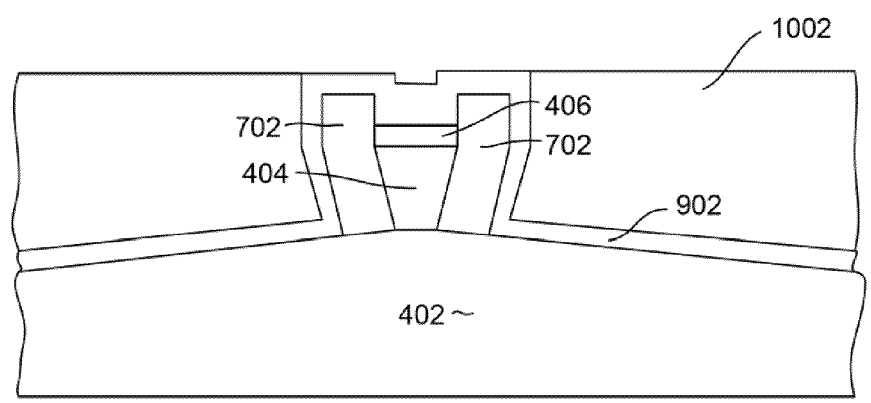

Then, a chemical mechanical polishing process (CMP) is performed to remove the bump 1006 formed over the write pole, resulting in a flat upper surface 1102 as shown in FIG. 11. A material removal process such as reactive ion milling (RIM) or ion milling (IM) or reactive ion etching (RIE) can then be performed to remove additional fill material 1002 to expose the RIE stop layer 902 as shown in FIG. 12. An end point detection method such as Secondary Ion Mass Spectrometry (SIMS) can be used to detect when the RIE stop layer 902 has been reached (ie. when the RIEM or IM or RIE should be terminated).

Figure 13:
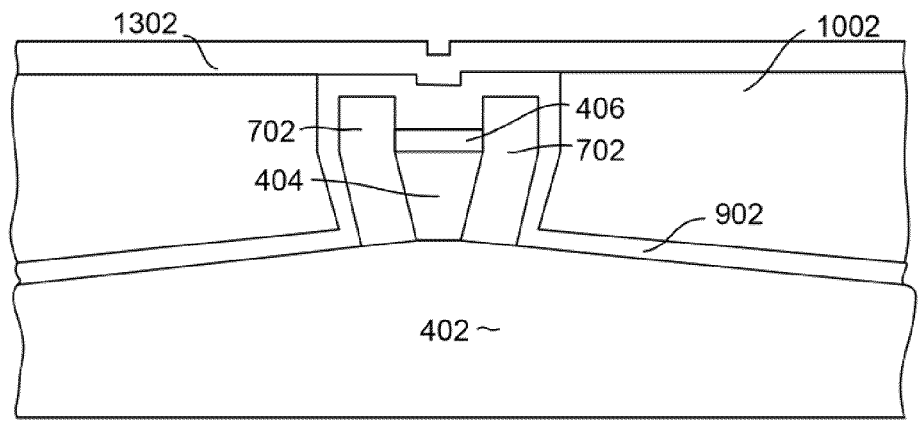
Figure 14:
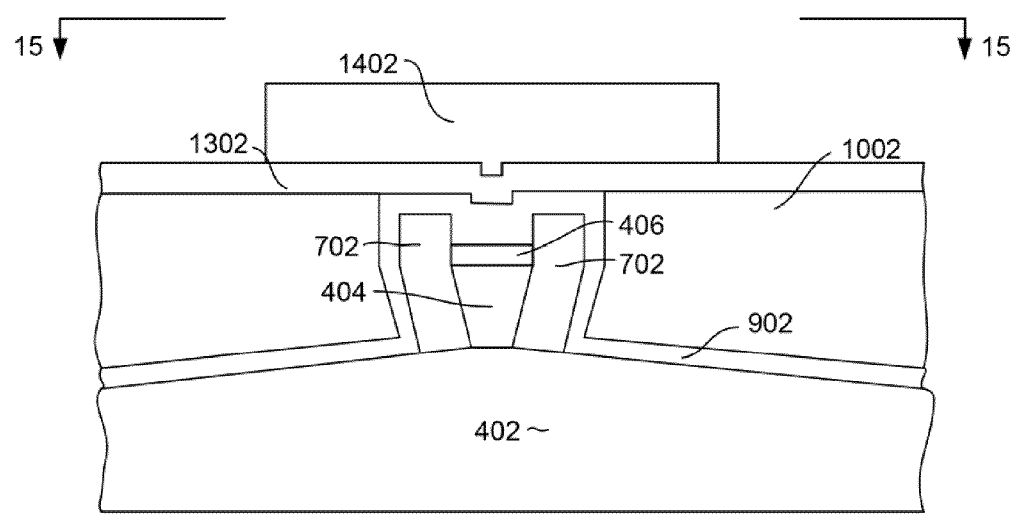
Figure 15:
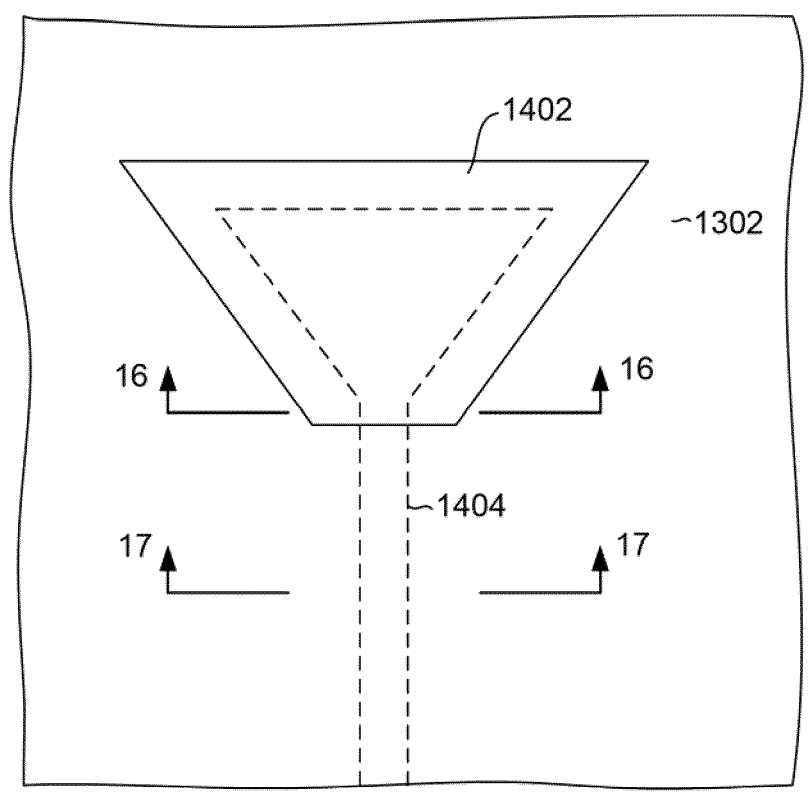

With reference now to FIG. 13, a non-magnetic bump layer 1302 is deposited. This layer 1302 can be constructed of a material such as NiC, SiC, Cr, Ru, Ir, etc. and can be deposited to a thickness of 40-200 nm or about 50 nm. Then, with reference to FIG. 14 a mask structure 1402 is formed over the non-magnetic bump layer 1302. The mask structure 1402 can be formed of a photolithographically patterned and developed photoresist layer and may contain other layers as well. The configuration of the mask layer 1402 can be seen more clearly with reference to FIG. 15, which shows a top down view as viewed from line 15-15 of FIG. 14. In FIG. 15, the location of the write pole 1404 is shown in dashed line to indicated that it is hidden beneath layers 1404, 1302 902 and 406.

Figure 16:
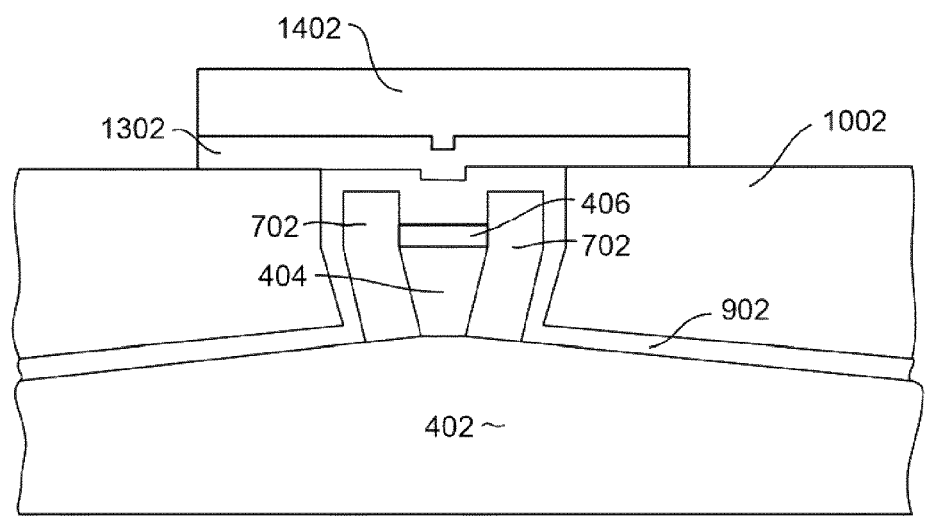
Figure 17:
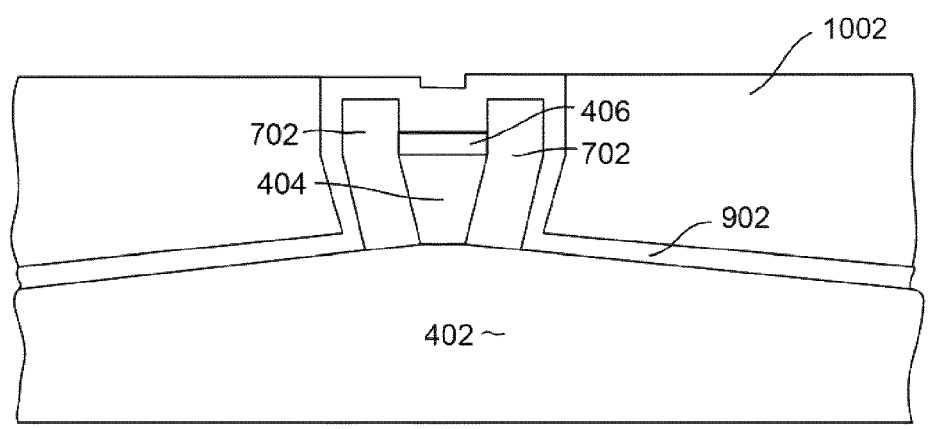

An ion milling process or reactive ion milling (RIE) can be performed to remove portions of the bump layer 1302 that are not protected by the mask 1402. An end point detection method such as SIMS can be used to stop the ion milling or RIE when the RIE stop layer 902 has been reached. This results in a structure as shown in cross section in FIGS. 16 and 17. FIG. 16 shows a cross sectional view near the flare point of the write pole 1404 as taken from line 16-16 of FIG. 15. FIG. 17 shows a cross sectional view of a location near the air bearing surface (ABS) as taken from line 17-17 of FIG. 15. A tapered angle ~50 degree will be formed from the ion milling process at the front end of the bump layer 1302, which will be shown in FIG. 25.

Figure 18:
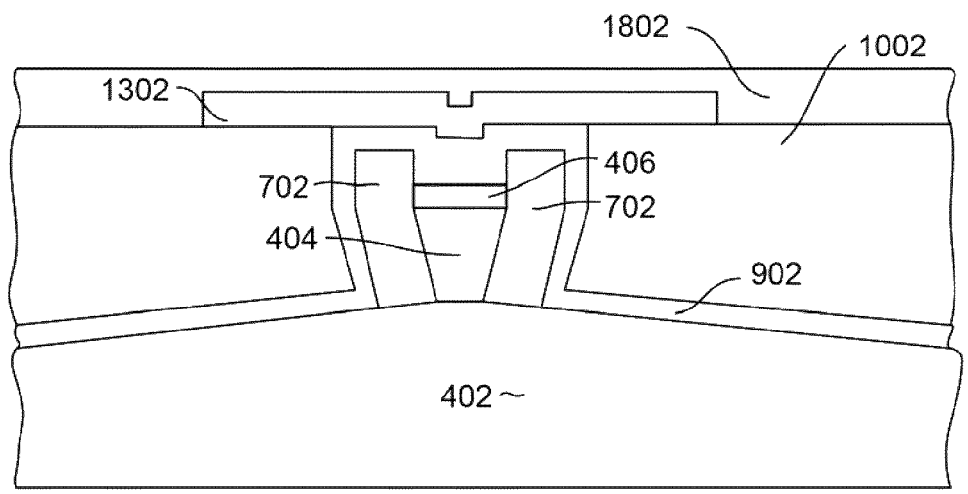
Figure 19:
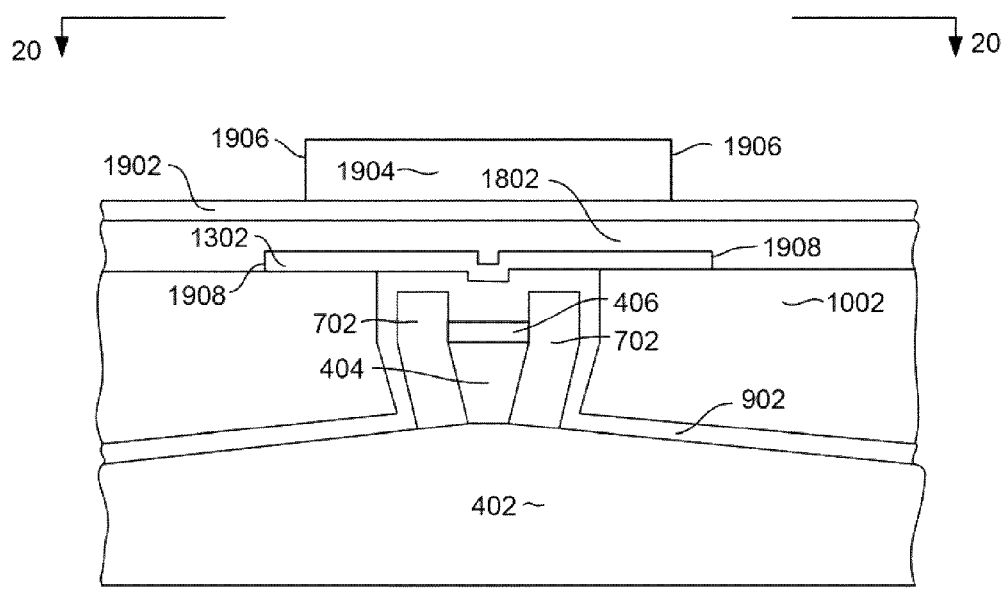
Figure 20:
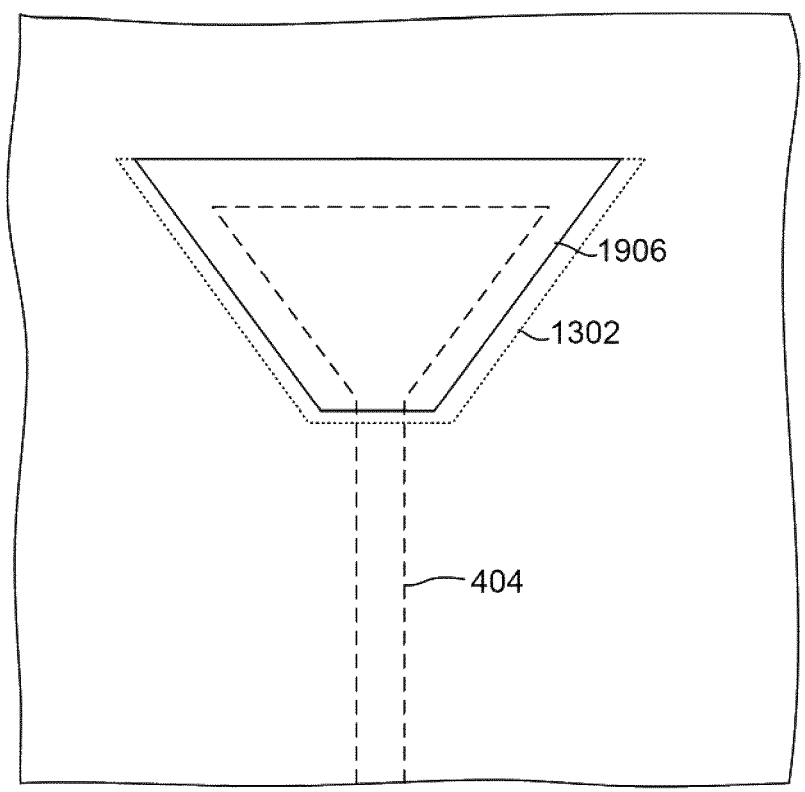

The photoresist layer 1402 is then stripped, and a layer of alumina 1802 is deposited, as shown in FIG. 18. This layer of alumina can be 80-200 nm or about 100 nm. Then, with reference to FIG. 19 a RIE hard mask layer 1902 is deposited, and a mask 1904 is formed over the RIE hard mask 1902. The RIE hard mask layer 1902 can be constructed of a material such as Rh, Ta, Cr, NiCr or some other non-magnetic, RIE resistant material, and can be deposited to a thickness of 40-60 nm or about 50 nm. The mask 1904 can include a photolithographically patterned photoresist layer, and is patterned so that it is slightly smaller than the underlying nonmagnetic bump layer 1302 so that the mask 1904 has outer edges 1906 that are inset from the outer edges 1908 of the bump layer 1302. This can be seen more clearly with reference to FIG. 20, which shows a top down view as taken from line 20-20 of FIG. 19. In FIG. 20, the write pole 314 (which is hidden beneath other layers) is shown in dashed line. The bump layer 1302 is shown in dotted line, as it is also hidden beneath other layers. As can be seen in FIG. 20, the mask 1906 is smaller than the bump layer 1302 so that the bump layer 1302 extends beyond the mask 1906, both at the front (toward the ABS) and at the sides.

Figure 21:
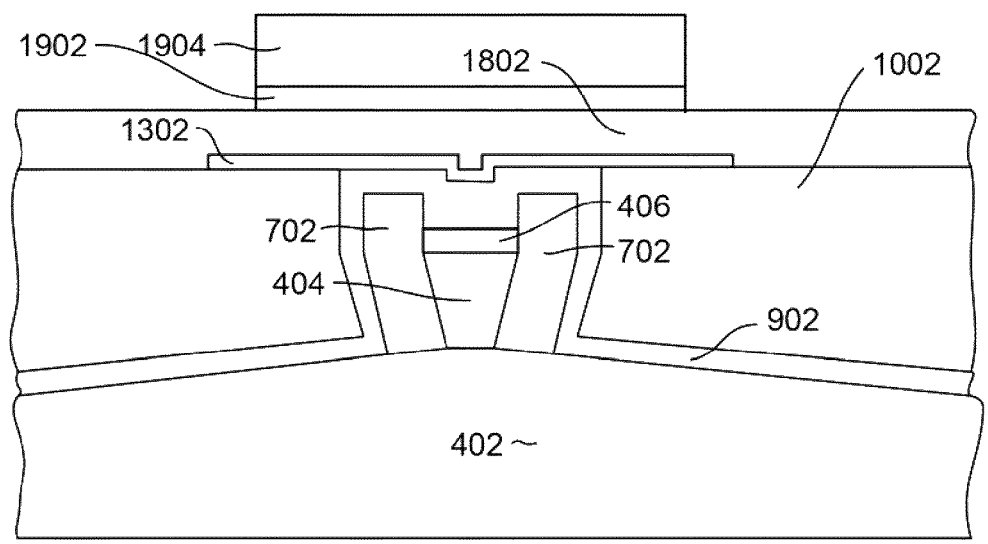

With reference now to FIG. 21, a material removal process such as ion milling or reactive ion etching (RIE) is performed to transfer the image of the mask 1904 onto the underlying hard mask layer 1902 by removing portions of the hard mask 1902 that are not protected by the mask 1904. Then, with reference to FIG. 22 a reactive ion etching (ME) is performed to preferentially remove the alumina fill layer 1002. The RIE is preferably performed in a chlorine base (BCl3/Cl2) chemistry.

Figure 22:
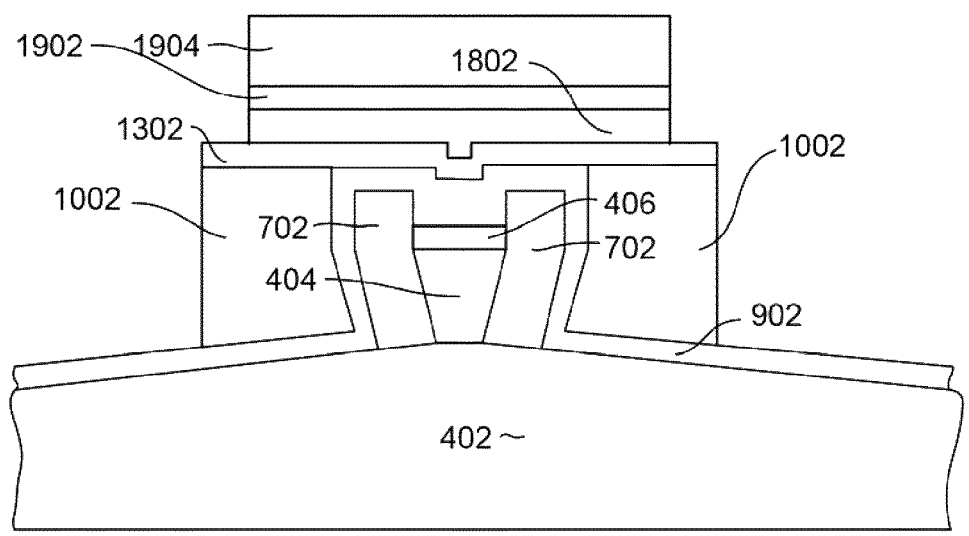
Figure 23:
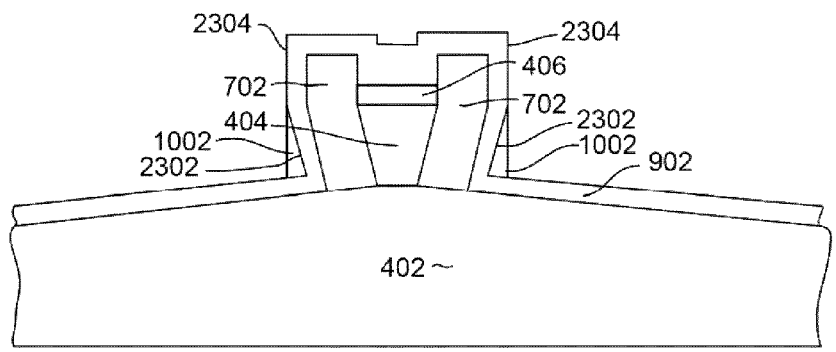
Figure 24:
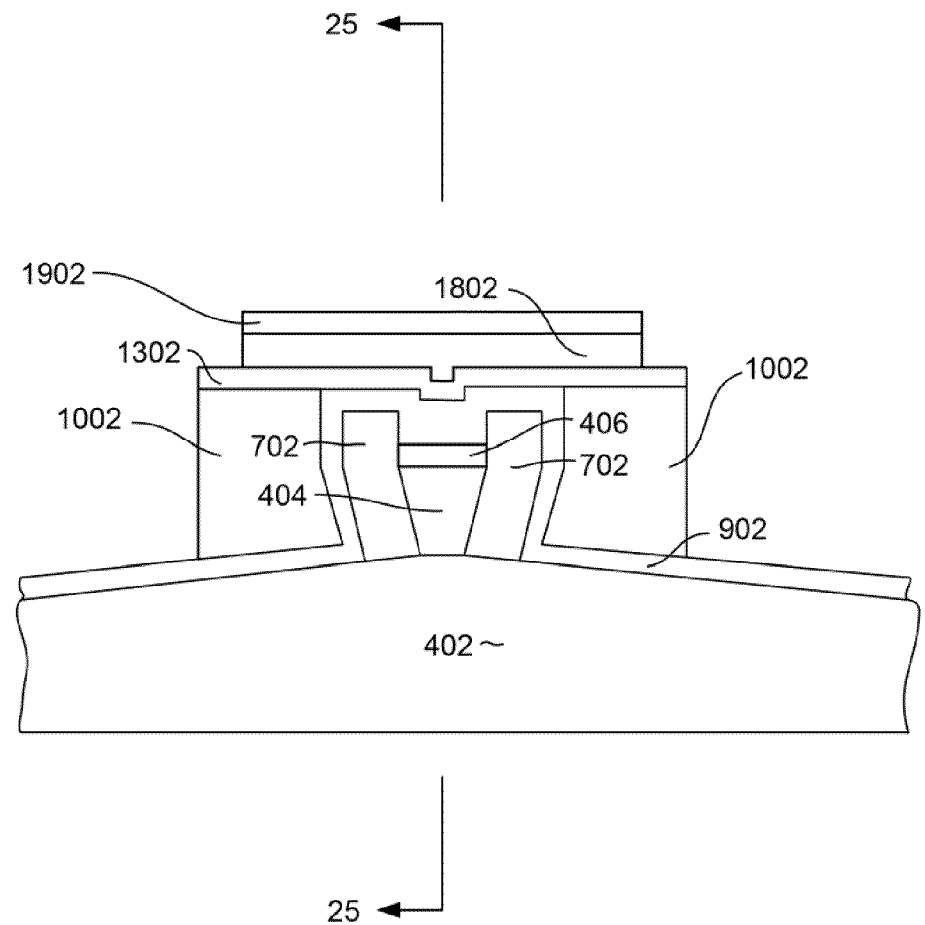

FIG. 22 shows a cross sectional view at a location away from the ABS, where the bump layer 1302 protects the fill layer 1002. As can be seen in this view, the bump layer protects the alumina fill layer 1002 so that the alumina fill layer is not removed in regions below the bump layer 1302. FIG. 23, however, shows a cross sectional view at a location near the ABS. As can be seen, overhanging portions 2302 of the RIE stop layer 902 and side walls 702 prevent removal of a portion of the alumina fill layer 1002 under this overhanging portion 2302, resulting in substantially vertical non-magnetic side gap walls 2304 at either side of the write pole 404 in the pole tip region near the ABS. This allows the later deposited trailing wrap-around magnetic shield to have side portions with inner edges that are substantially vertical (i.e. substantially perpendicular to the trailing edge of the write pole), thereby avoiding the formation of voids in the deposition of the trailing wrap-around magnetic shield. This will become clearer below. The mask layer 1904 (FIG. 22) can then be lifted off, resulting in a structure as shown in cross section in FIG. 24 as viewed in the area of the bump layer 1302 and layers 1802 and 1902.

Figure 25:
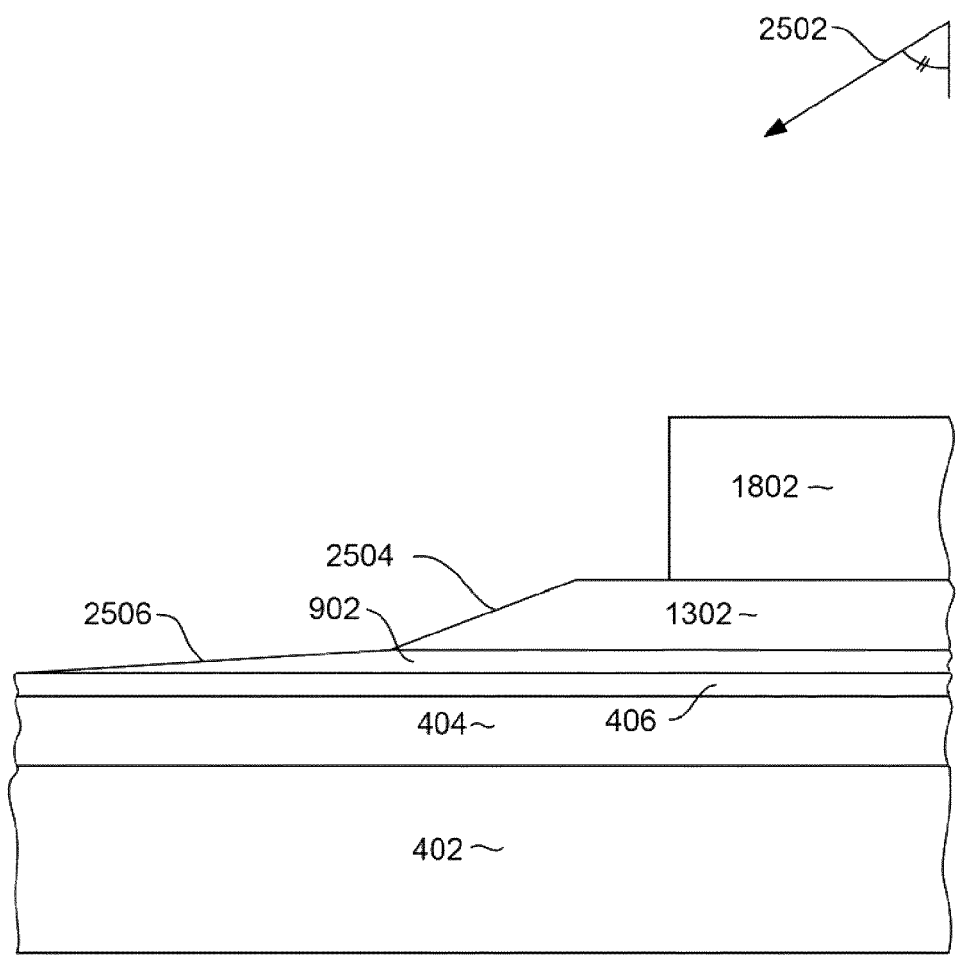

With reference now to FIG. 25, a short ion milling is performed to remove a portion of the RIE stop layer 902, and slightly change the tapering angle of layer 1302. The ion milling is preferably performed at an angle ~50 degrees relative to normal as indicated by arrow 2502. Shadowing from the layer 1802 and 1302 allows the angled ion milling to form the RIE stop layer 902 with a tapered surface 2506 having a ~6 to 10 degree angle (relative to plane of the deposited layer and substrate).

Figure 26:
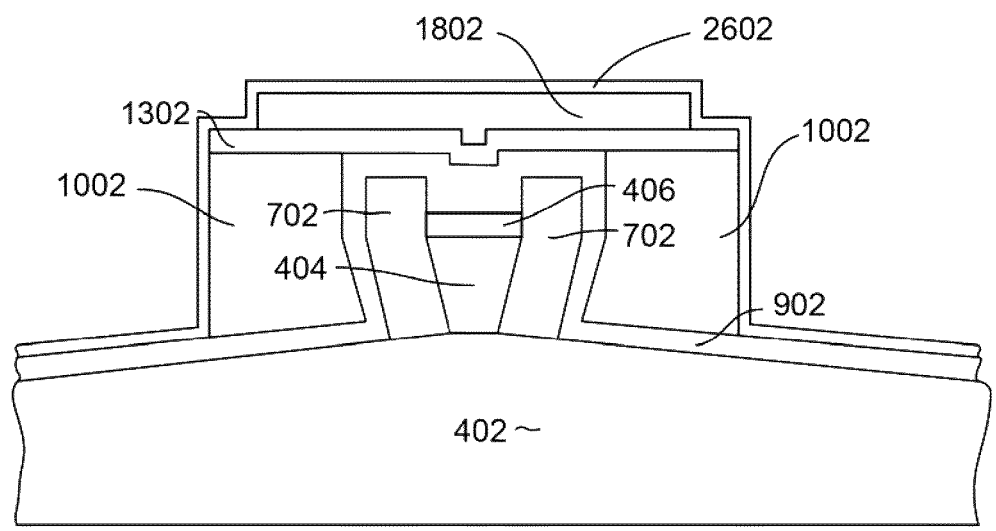
Figure 27:
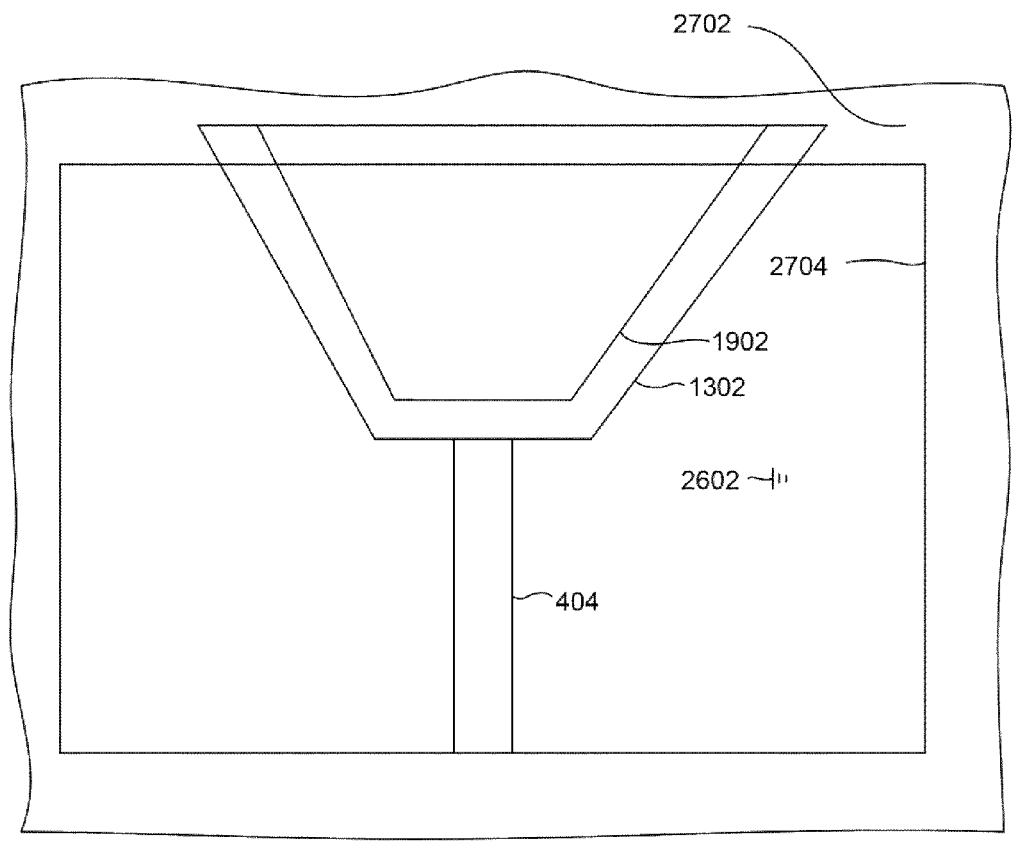
Figure 28:
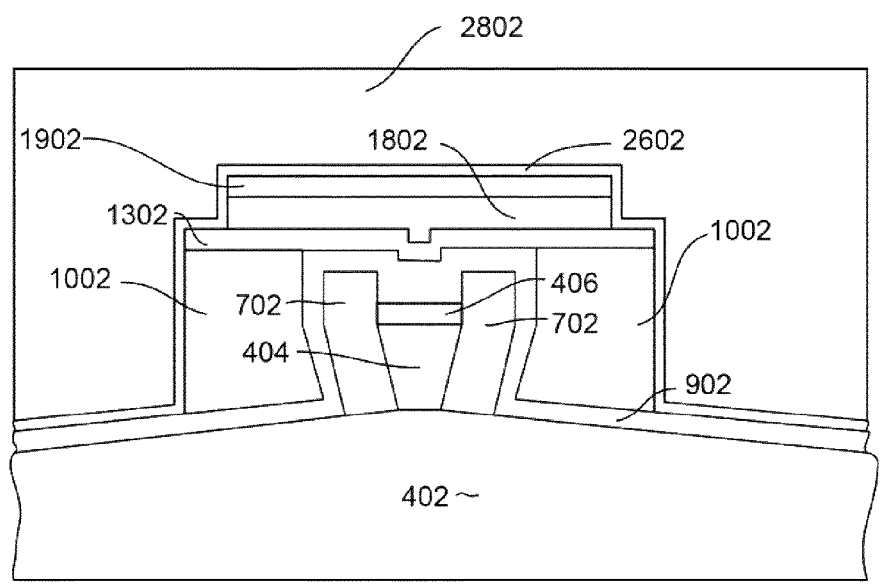

Then, with reference to FIG. 26, an electrically conductive (preferably magnetic) seed layer 2602. An electroplating frame mask 2702 is then formed which can be seen in a top down view in FIG. 27, having an opening 2704 into which a trailing shield can be electroplated. Then, an electrically conductive material such as NiFe or CoFe can be electroplated into the opening 2704 in the mask 2702, using the seed layer 2602 as an electroplating seed. The mask can then be lifted off, leaving a structure such as that shown in cross section in FIG. 28. The above described process results in a magnetic shield 2802 that tapers away from the write head with increasing distance from the air bearing surface (ABS), such as the shield 338 of FIG. 3.

Figure 29:
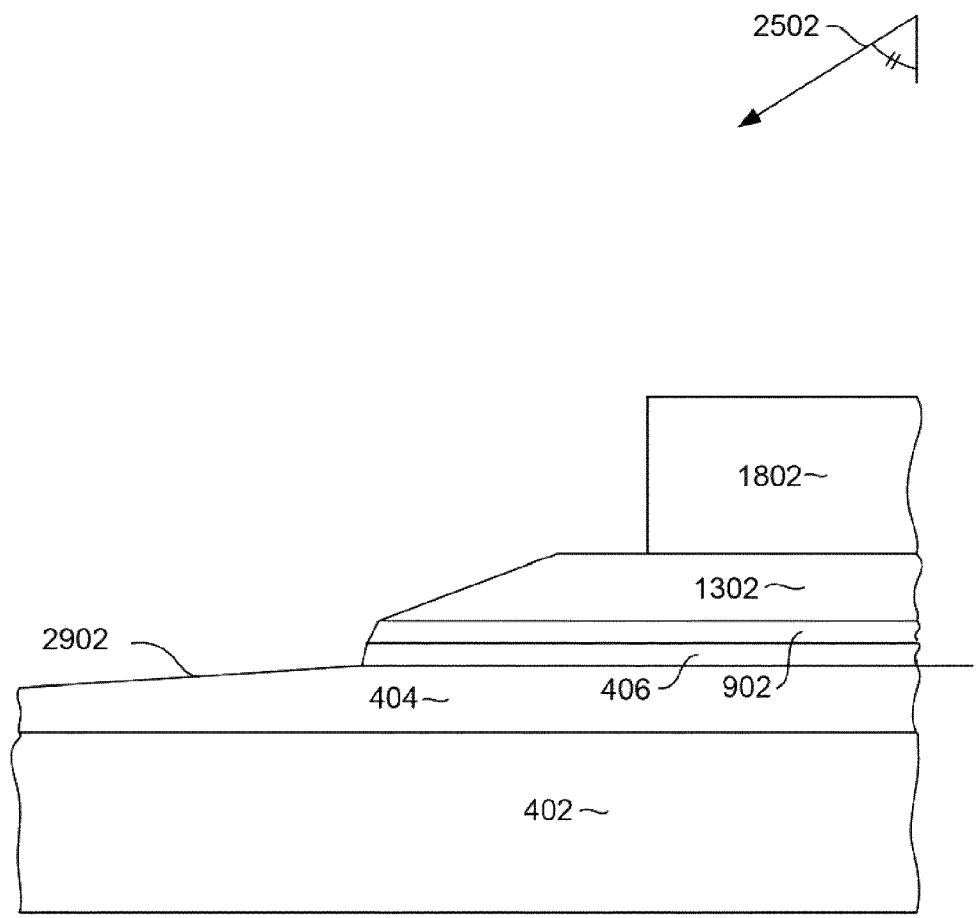
FIG. 29 is a cross sectional view of a write head in an intermediate stage of manufacture illustrating a method for manufacturing a write head according to an alternate embodiment of the invention.

With reference to FIG. 29, in an alternate embodiment of the invention, the write pole 404 itself also has a tapered trailing edge. To construct this embodiment, the ion milling process described above with reference to FIG. 25 is performed sufficiently to remove the alumina hard mask 406 and RIE stop layer 902 and also sufficiently to remove a portion of the trailing edge of the write pole 404. Again the ion milling is a sweeping ion milling performed at an angle relative to normal so that shadowing from the layers 406, 902, 1302, 1802 results in a desired tapered trailing edge 2902 with angle of 10 degree to 40 degrees. The ion milling used to form the tapered trailing edge 2902 can be a continued application of the ion milling described above in FIG. 25 or can be a separate ion milling at angle between 30 degrees to 70 degree or ~45 degree from vertical. In order to form a write pole 404 having a tapered trailing edge 2902 as described above, the write pole material 404 will be deposited with an additional thickness in order to compensate for the material lost to the milling process when forming the tapered trailing shield 2902.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic write head for perpendicular magnetic data recording, comprising:
   a magnetic write pole having a trailing edge and a pole tip extending to an air bearing surface;
   a magnetic trailing shield separated from the trailing edge of the magnetic write pole by a non-magnetic layer, the trailing shield having a leading edge that further comprises:
   a first portion extending to the air bearing surface, the first portion being perpendicular to the air bearing surface;
   a second portion that tapers away from the trailing edge of the write pole as it extends from the air bearing surface; and
   a third portion that that is removed from the air bearing surface and that steps away from the write pole.

2. The magnetic write head as in claim 1 wherein the stepped portion defines secondary throat height of the trailing magnetic shield as measured from the air bearing surface.

3. The magnetic write head as in claim 1 wherein the trailing magnetic shield has a back edge opposite the air bearing surface that defines a throat height of the trailing shield as measured from the air bearing surface, and wherein the stepped portion defines a secondary throat height also measured from the air hearing surface.

4. The magnetic write head as in claim 3 wherein the secondary throat height is less than the throat height.

5. The magnetic write head as in claim 1 wherein the write pole has a leading edge and wherein the trailing edge of the write pole is tapered such that a distance between the leading edge and trailing edge decreases as the write pole extends toward the air bearing surface.

6. The magnetic write head as in claim 1 further comprising a trailing magnetic return pole connected with the trailing magnetic shield and magnetically connected with the magnetic write pole in a region removed from the air bearing surface.

7. The magnetic write head as in claim 6 wherein magnetic connection between the trailing return pole and the magnetic write pole is made by a magnetic shaping layer.

8. The write head as in claim 1 wherein the trailing magnetic shield includes first and second side shield portions adjacent to first and second sides of the write pole, the side shield portions being separated from the magnetic write pole by a non-magnetic material, each of the side shield portions having an inner edge, located toward the write pole, the inner edge portions being substantially perpendicular to the trailing edge of the write pole.

9. The write head as in claim 1, wherein the leading edge of the trailing magnetic shield further comprises a fourth portion located between the second portion and the third portion, the fourth portion being parallel with the trailing edge of the write pole and perpendicular to the air bearing surface.

10. The write head as in claim 1, wherein the third portion has a surface that is substantially parallel with the air bearing surface.

* * * * *

UNITED STATES PATENT AND TRADEMARK OFFICE
CERTIFICATE OF CORRECTION

PATENT NO. : 8,422,168 B2
APPLICATION NO. : 12/343709
DATED : April 16, 2013
INVENTOR(S) : Wen-Chien David Hsiao et al.

Page 1 of 1

It is certified that error appears in the above-identified patent and that said Letters Patent is hereby corrected as shown below:

In the Specification:

Column 8, line 48 replace "air hearing" with --air bearing--.

Signed and Sealed this
Fourteenth Day of July, 2015

Michelle K. Lee
*Director of the United States Patent and Trademark Office*